Patented June 7, 1938

2,119,616

UNITED STATES PATENT OFFICE 2,119,616

PROCESS OF PASTEURIZING MILK

Rolan Jay Wightman, Little Falls, N. Y., assignor to Cherry-Burrell Corporation, Wilmington, Del., a corporation of Delaware No Drawing. Application April 1, 1936,
Serial No. 72,177

4 Claims. (Cl. 99—212)

This invention relates to improvements in methods of pasteurization. While the improved methods of this application are particularly desirable for pasteurizing milk and are hereinafter described as so employed, the invention is not limited to the pasteurization of milk, but is also adapted for pasteurizing other substances, such for example as cream, milk compounds, and vegetable and fruit juices.

Milk is commonly pasteurized by heating it to and holding it at a prescribed temperature for a period of time, the length of which usually depends upon the pasteurizing temperature to which the milk is heated, and then cooling the milk to a temperature suitable for bottling or storing it. For example, in long time milk pasteurizing processes that have been used extensively, the milk is heated to about 145° F. and held at that temperature for about thirty minutes before cooling it, while in the more recent so-called short time pasteurization processes the milk is heated to a higher temperature, such as about 160° F., at which temperature it is held for a relatively short period of about fifteen seconds. In both the long and short time processes as heretofore commonly practiced, the raw milk has been heated to the required pasteurizing or holding temperature by a heating operation which is uninterrupted by any cooling or lowering of the temperature of the milk. Short time pasteurization, in addition to the saving of time it effects, is considered advantageous over long time processes because the milk is in contact with the equipment for a much shorter time, with the result, that the milk has less chance for picking up metallic or "off" flavors. Experience with short time pasteurization processes indicates that the flavor of the milk is improved by the short time methods, it being believed that the enzymes have not been affected, and that the final pasteurized product has more nearly the flavor of fresh, sweet, raw milk.

Not infrequently, however, short time milk pasteurizing methods, as practiced at present, are unsatisfactory on account of objectionably high bacterial counts in the pasteurized milk. The long time and short time holding systems, if both are operated properly, show very little difference in cream layer or volume. Normally there should be very little difference shown in bacterial reduction, especially in bacteria of pathogenic type, although it has been noticed that a heat-resisting type of bacteria has been more prevalent in the short time systems than in the long time systems.

The objects of my invention are to provide a novel process of pasteurization giving improved results over previous processes; also to improve short time pasteurization methods so as to materially reduce the bacterial counts in the pasteurized products; also to improve short time milk pasteurizing methods in a way that will not impair the cream layer or volume or the flavor of the milk; also to provide an expeditious and efficient method of pasteurizing milk which will improve the cream layer and give a lower bacterial count than previous short time pasteurization methods; and also to provide a method of pasteurizing milk which will insure satisfactory results as to bacterial reduction, cream layer and flavor in the pasteurized milk.

According to my improved pasteurization methods, the milk, as heretofore, is heated to and held at a suitable temperature for the appropriate period of time, but prior or preliminarily to this heating and holding treatment the milk is subjected to shock or relatively sudden changes in temperature one or more times, after which said heating and holding treatment is carried out. For example, the milk may be first heated from a cold condition to a predetermined temperature not lower than about 150° F. and not above about 160° F. (said heated temperature being preferably from 155° to 158° F. inclusive), and then cooled down to a temperature of about 145° F. or less, following which preliminary heating and cooling the milk is again heated to a temperature of about 160° F. and is held approximately at that temperature for the required short time, at least about fifteen seconds. It is then cooled to 40° F. or other temperature suitable for bottling or other usual operations which succeed pasteurization.

The first or preliminary heating and cooling apparently lowers the resistance of the bacteria to a point such that the following heating and short time treatment is adequate to kill the bacteria. Nevertheless said preliminary heating is such that its action in conjunction with the final heating and holding does not impair the cream layer or volume or the flavor of the milk any more than is done in ordinary short time pasteurization. On the contrary, improvements in the cream layer as well as greatly reduced bacterial counts have been obtained in pasteurizing milk by the hereindescribed methods.

In the preliminary heating of the raw milk, if its temperature is much below 100° F., it is heated up to about 100° F. and may be then raised from that point to the before mentioned predetermined temperature between 150 and 160 degrees F. in a period of time which may vary from approximately two seconds to four minutes. The time taken for heating the raw milk up to the 100° point is not believed to be especially important and may vary from a few seconds to one-half hour more or less, but it is considered that the time for heating the milk from about 100° to the temperature between 150 and 160 degrees should be kept within about the limits mentioned.

The cooling of the milk down from said preliminary high temperature to approximately 145° or less may be effected in a period of time varying from about one second to one minute more or less, and the time for again heating the milk to the final minimum temperature of about 160°, at which it is held for the minimum period of about fifteen seconds, may be from about two seconds to two minutes more or less, depending upon the particular type of equipment used and the length of time required for the milk to flow over or through it. The time for the final cooling of the milk to bottling or storing temperature may vary over a considerable range, such as from about two seconds to four minutes more or less.

Good results have been obtained in practice by carrying out the method with the following temperature and time schedule:

The raw milk at a temperature of approximately 40° F. is raised to around 100° F. in approximately two minutes and further heated from that point to 158° F. as near as possible in about one minute, then promptly cooled down to 145° F. in approximately one minute, then heated from this temperature to approximately 160° F. in about one and one-half minutes and held at that temperature for approximately fifteen seconds, and finally cooled to about 38° F. in about three seconds. This procedure reduced the bacterial count more than thirty-five percent over previous ordinary short time pasteurization with the same apparatus and the cream layer was also improved.

If desired, there can be a short holding period between the preheating and precooling stages. That is, the milk may be held at its preheated temperature around 155° to 158° for a short time before precooling it. This preliminary holding period may vary in length from about one second to about ten seconds, and should be adjusted according to the preheated temperature used. While such preholding period is desirable in performing my method with some types of pasteurizing apparatus, in the use of other types of apparatus it is desirable not to have any holding period between the preheating and precooling stages.

From the preceding description of the method, it will be noted that in the first or preliminary heating, the milk is heated from approximately 100° F. to a predetermined temperature, and in the final heating also, it is heated to a predetermined temperature, and both of these temperatures can be fixed and controlled by suitable automatic means, known in the pasteurization art.

In the methods as above described, the milk is preliminarily heated and cooled only once, but when bacteria, which are exceptionally hard to kill, are present in the milk, or when even further reduction of bacteria is desired, multiple preliminary heating and cooling treatments before the final heating and holding process, may be employed. For example, the raw milk at around 40° F. may be heated up to 155° to 158° F. in say from two seconds to two minutes more or less, then cooled down to 145° F. or less in from two seconds to two minutes more or less, and then reheated to 155° to 158° and recooled to 145° or less in about the same periods of time as used for the first heating and cooling, before finally heating the milk to and holding it at approximately 160° for a minimum of about fifteen seconds.

I claim as my invention:

1. The hereindescribed short time method of pasteurizing milk which comprises raising the temperature of the milk to about 100° F. and preliminarily heating the milk from that temperature to a temperature of approximately 158° F. in a period of time not exceeding four minutes, then promptly cooling the milk before pasteurization thereof occurs at least to approximately 145° F. in a period of time not exceeding about one minute, then heating the milk to a temperature of approximately 160° F. in a period of time not exceeding about two minutes and holding it approximately at 160° F. for approximately fifteen seconds, and then cooling the milk.

2. The hereindescribed short time method of pasteurizing milk which comprises preliminarily heating the milk to a temperature between 155° F. and 160° F., such portion of said heating which raises the temperature of the milk over and above 100° F. being accomplished in a period of time not exceeding four minutes, then cooling the milk at least to approximately 145° F. within a period of time not exceeding one and one-half minutes from the time the milk attained said preliminary heated temperature, then heating the milk to a final high temperature of about 160° F. in a period of time not exceeding about two minutes, and holding it approximately at said last mentioned temperature for a period of time of approximately fifteen seconds, and then cooling the milk.

3. The hereindescribed short time method of pasteurizing milk which comprises preliminarily heating the milk to a temperature of approximately 158° F., such portion of said heating which raises the temperature of the milk over and above 100° F. being accomplished in a period of time not exceeding four minutes, holding the milk approximately at 158° F. for a period of time not exceeding ten seconds, then immediately cooling the milk before pasteurization thereof occurs at least to approximately 145° F. in a period of time not exceeding about one minute, then heating the milk to a temperature of approximately 160° F. in a period of time not exceeding about two minutes and holding it approximately at 160° F. for approximately fifteen seconds, and then cooling the milk.

4. The hereindescribed method of pasteurizing milk which comprises multiple preliminary heatings of the milk to a temperature between 155° F. and 160° F., such portion of each said preliminary heating which raises the temperature of the milk over and above 100° F. being accomplished in a period of time not exceeding approximately two minutes, promptly cooling the milk after each preliminary heating and before pasteurization thereof occurs at least to a temperature of approximately 145° F. in a period of time not exceeding approximately one minute, then heating the milk to a final high temperature of approximately 160° F. in a period of time not exceeding about two minutes, and holding it approximately at 160° F. for approximately fifteen seconds, and then cooling the milk.

ROLAN JAY WIGHTMAN.